United States Patent [19]

Döring

[11] 4,341,313
[45] Jul. 27, 1982

[54] SHELVING FOR PALLETS

[76] Inventor: Erich Döring, Im Hölzeli, Berneck, Switzerland, 9442

[21] Appl. No.: 53,423

[22] Filed: Jun. 29, 1979

[30] Foreign Application Priority Data

Jul. 4, 1978 [DE] Fed. Rep. of Germany ....... 2829325

[51] Int. Cl.³ .............................................. A47F 5/00
[52] U.S. Cl. .................................. 211/151; 414/276
[58] Field of Search .............. 414/276, 233, 235, 239; 211/151, 162, 49 D; 108/93

[56] References Cited

U.S. PATENT DOCUMENTS

| 3,038,613 | 6/1962 | Sylvester et al. | 211/162 |
| 3,465,894 | 9/1969 | Setecka | 211/151 X |
| 3,567,039 | 3/1971 | Evans | 211/162 |
| 3,757,967 | 9/1973 | Colbridge | 211/162 |
| 4,155,462 | 5/1979 | Bendel | 211/151 |
| 4,197,047 | 4/1980 | Haldimann | 414/276 |

FOREIGN PATENT DOCUMENTS 2800447 7/1978 Fed. Rep. of Germany .
503633 4/1971 Switzerland .

Primary Examiner—Roy D. Frazier
Assistant Examiner—Robert W. Gibson, Jr.
Attorney, Agent, or Firm—Mawhinney & Mawhinney & Connors

[57] ABSTRACT

A shelving for pallets in which the compartments defined by the frame are continuous in side by side relation and on top of one another and adapted to receive at least three pallets one behind the other on a support which is inclined toward a common loading and unloading side. Each compartment is provided with at least one pair of rails, which extend at an inclination toward the common loading and unloading side and accommodate two flat pallet carriages of different heights in rolling engagement, the lower of the carriages being adapted to roll completely under the higher carriage without any intervention. A further pair of rails may be disposed between the first pair of rails which receives a third very flat pallet carriage that fits completely under the lower pallet carriage. A first pallet is to be placed on the pair of rails while the second and third pallets are placed on the carriages.

6 Claims, 3 Drawing Figures

SHELVING FOR PALLETS

BACKGROUND AND SUMMARY OF THE INVENTION

The invention relates to shelving for pallets in which the compartments defined by the frame are continuous in side by side relation and on top of one another and adapted to receive at least three pallets in rolling engagement on a plane which is inclined toward the unloading side.

In a known kind of shelving for pallets the pallets can only be stacked per compartment in side by side relation and on a plurality of floors. It is a disadvantage of this kind of shelving that a small useful shelf area requires a relatively large space for passageways for movement of the fork-lift trucks which are used to lift the pallets into the individual compartments.

Therefore so-called continuous shelving for pallets was developed in which the pallets can also be placed one behind the other. Such continuos shelving is loaded from one side and unloaded from the other. This requires alleys at both sides of the shelving. Rollers are provided on the shelves of the compartments at an inclination toward the discharge side so that the pallets placed at the loading side roll toward the unloading side. When a pallet is removed from the unloading side, the last pallets introduced roll toward the discharge end.

This type of shelving is suitable for a plurality of similar goods per pallet or compartment, i.e. the successive pallets arriving and then being removed one after the other at the unloading side should contain approximately the same articles. The deeper the continuous run-through shelving is, the more economical the storage. At one side an alley is needed for the loading fork-lift truck, and at the other side an alley is needed for the fork-lift truck used to remove the pallets.

It is the object of the invention to provide shelving for pallets of the kind defined hereinabove wherein a favorable useful relationship is obtained between the shelving area and the passageway area required for loading and unloading, in other words, that the space requirement for the shelving is reduced.

To meet this object it is provided, in accordance with the invention, that the shelving for pallets as specified comprises at least one pair of rails, in each compartment, which extend at an inclination toward the common loading and unloading side and accomodate two flat pallet carriages of different heights in rolling engagement, the lower of the carriages being adapted to roll completely under the higher carriage.

With this embodiment of the shelving for pallets it is thus possible to load and unload each compartment from one side. When a compartment is empty, the carriages rolling along on the inclined rails will roll forwardly against a stop. Then a pallet can be placed on the higher carriage. The fork-lift truck then lifts another pallet somewhat above the level of the surface of the lower carriage and, as the pallet is moved into the compartment, it urges the higher pallet carriage with its pallet toward the rear. This carriage rolls back. Upon putting down the pallet the high pallet carriage with its pallet abuts against the backside of the front pallet. Now a further pallet can be introduced by first lifting it somewhat above the level of the pair of rails and then pushing it into the compartment whereby the lower pallet carriage with its pallet and hereby also the higher pallet carriage with its pallet are pushed toward the rear. After the front pallet has been placed on the pair of rails, the two rear pallets each resting on a pallet carriage are secured against any rolling movement toward the front because there is sufficient frictional locking engagement between the front pallet and the rails so that the pallet cannot be displaced forwardly by the pallets which are supported on roller carriages. It would also be possible to provide supporting rails or beams at the front next to the pair of rails and to have their top surfaces project somewhat above the level of the rails so that the pallets will be set down on these supports rather than on the guide rails. The guide rails and any possible support rails should be provided at such spacing that the prongs of the fork-lift truck may enter between them so that they can be inserted under the pallets rather than into recesses provided for the same. The principle underlying the invention is applicable also to shelving in which no more than two pallets can be placed behind each other. In this case only one carriage is to be provided.

The span of the shelving and thus the width of the individual compartments will determine whether or not several pairs of rails are provided for several rows of pallets to be placed one beside the other. The pairs of guide rails are mounted on the shelves so as to be sloping toward the passageway from which the pallets are introduced and at which they are removed. It is particularly advantageous to provide shelving assemblies of two shelvings for pallets according to the invention positioned at both sides of a single alley. In this case the single alley is used for loading and unloading both shelvings. In this case both shelvings may be placed with their backs against a wall which may be the outside wall of a building. The advantage of a shelving system in accordance with the invention is particularly great when the shelving has to be loaded and unloaded relatively seldom, in other words where, in general, one fork-lift truck is sufficient for loading and unloading.

Conveniently, each pallet carriage is supported by flanged wheels for rolling motion on a pair of rails. If each pallet carriage rolls on its own pair of rails, double flanged wheels may be especially advantageous.

A particular embodiment of the invention provides a single pair of rails only for the higher and the lower carriages. In this case the higher carriage rolls off the rails by means of narrow flanged wheels having their flanges at the outside of the rails and having their roller or flange extend at most up to the middle of the rail head. The lower carriage, at the same time, rolls off the rails by means of narrow flanged wheels which have their flanges engage the inside of the rails and their roller or flange likewise extend, at most, to the middle of the rail head. The flanged wheels of the lower pallet carriage thus are directed outwardly and those of the higher pallet carriage are directed inwardly. The inside free ground clearance under the higher carriage is a little greater than the external profile of the lower carriage so that the latter can roll completely under the higher carriage.

It is especially with this embodiment that a third very flat pallet carriage can be supported for rolling movement on another pair of rails disposed between the first pair of rails. This third carriage will fit completely under the lower pallet carriage which is designed with a corresponding free ground clearance. With this design it is possible for the depth of the shelf to correspond to the depth of four pallets because a total of three pallets can be placed on their respective carriages behind the front pallet which is set down on the pair of guide rails or a pair of support rails.

A further development of the invention provides for at least one upwardly inclined ramp for the rollers, acting as a sloping brake at or beside the front end of the rails to be arranged for the purpose of preventing hard hitting of the forwardly rolling carriage against the stop provided at the front end. As each front pallet is removed, the carriages roll automatically forwardly on the slightly sloping path until they run up on the inclined ramp and become stopped against the abutment means.

Thus all the embodiments of the invention enable the saving of space for the passageways for loading and unloading since the shelving can be filled from one side with two or three or even four pallets in one row pallets. However, two or three rows of pallets normally cannot be reached by the fork-lift truck. It may be convenient for better organization to give the carriages different paint coats and then red painting of the high carriage may be used to signal that the entire depth of the shelf behind the same is empty.

Displacing the carriages on rollers has an advantage over roller trains in that each carriage and thus each pallet requires no more than four wheels whereas, when using roller trains at least six to eight wide rollers are required per pallet. Furthermore, outside of the shelvings the pallets may be set down anywhere so that stones, steel chips and the like are pressed into the underside because, in general, the pallets are made of wood. With such foreign matter adhering to the underside, the roller trains would be damaged and rolling would become more difficult. When placing the pallets on carriages these difficulties are avoided and, as a consequence, trouble-free operation over long periods of time is guaranteed in particularly simple manner and at a very small gradient only.

BRIEF DESCRIPTION OF THE DRAWINGS

The invention will be described further, by way of two examples, with reference to the accompanying drawings, in which.

DETAILED DESCRIPTION OF THE INVENTION

Figure 1:
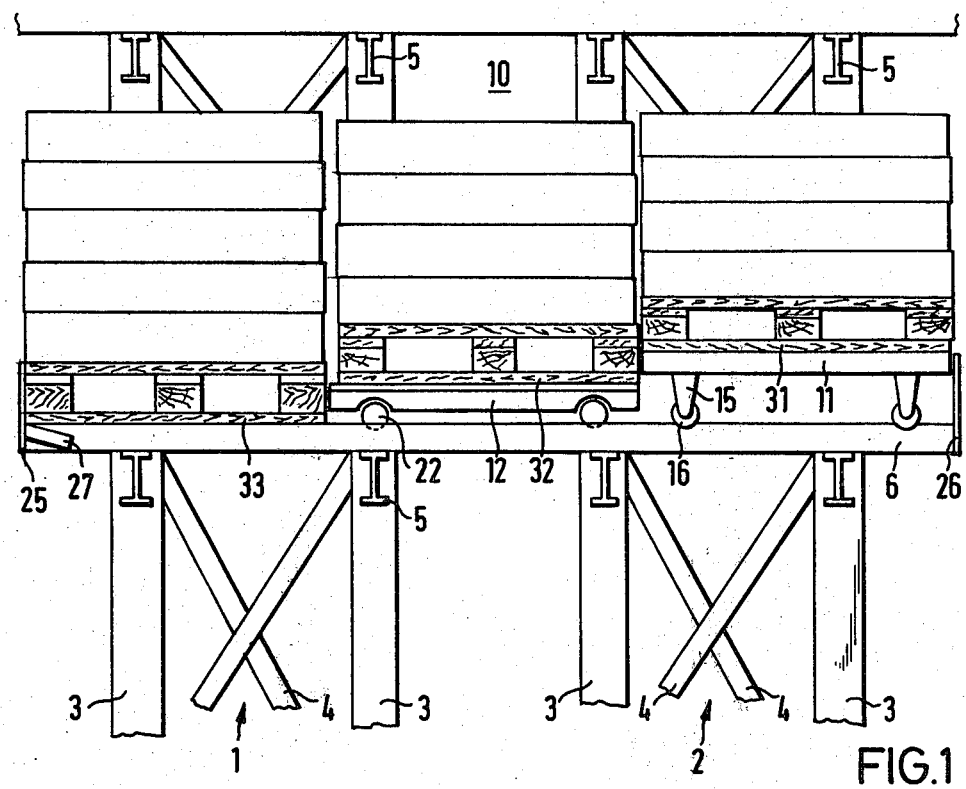
FIG. 1 shows an embodiment of shelving for three pallets to be set down one behind the other.
Figure 2:
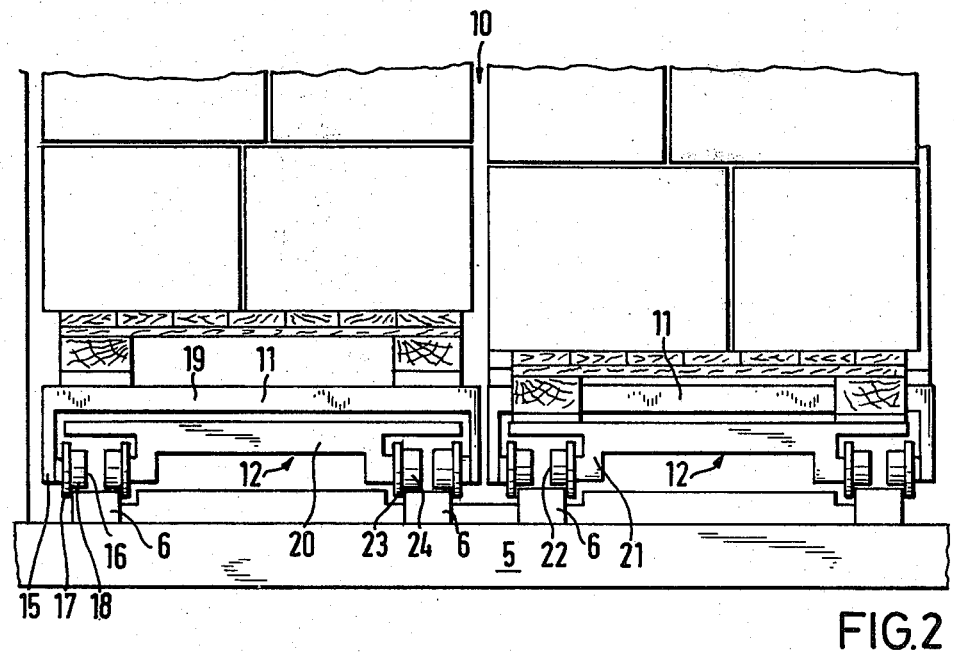
FIG. 2 is a front elevational view of the shelving compartment shown in FIG. 1.

As shown in FIGS. 1 and 2, this embodiment comprises two normal shelvings 1 and 2 composed of vertical posts 3 which are interconnected by sway braces 4 and transverse beams 5 in the direction of the shelving as well as guide rails 6 in the direction of the depth of the shelving or the shelving compartments 10. The connection, reinforcement, and the general structure of such shelvings for pallets are known per se so that details thereof need not be explained. It is a matter of course that sufficient stability against swaying and a corresponding load capacity must be provided for. The depth of the shelves determined by the guide rails 6 corresponds to that of three pallets. A high pallet carriage 11 and a low pallet carriage 12 each supported on narrow flanged wheels are disposed on the guide rails 6.

The higher pallet carriage 11 straddles the lower pallet carriage 12 by outer brackets which serve to support the flanged wheels 16, the flanges 17 of which are in engagement with the outside surface of the guide rails and the treads or rollers 18 of which lie on the upper surface of the guide rails 6 and have a width corresponding to approximately 40% of the width of the guide rails 6. This design provides relatively great free ground clearance under the high carriage 11 so that there is room for the lower carriage 12 which must be adapted to roll entirely under the high carriage. In the space between the guide rails 6 the carriage 12 is provided below its load board 20 which extends parallel to the load board 19 of the high carriage 11 with brackets 21 for its narrow flanged wheels 22, the flange 23 of which may be engaged with the inner surface and the roller 24 of which may be engaged with the top surface of the guide rail 6 so as to guide the lower carriage 12.

In the embodiment shown, each shelving compartment 10 comprises two pairs of rails 6 beside each other and a high pallet carriage 11 and a low pallet carriage 12 on each pair of guide rails.

As may be seen in FIG. 1, a pallet 31 is set down on the high pallet carriage 11 and a pallet 32 on the low pallet carriage 12, while a pallet 33 is set down in front of them directly on the guide rails 6. The pallets carry different kinds of goods. The shelving compartment 10 of the shelving shown in FIG. 1 is loaded from the left. It is toward this side that the guide rails or their upper surfaces or running surfaces are inclined. An abutment each in the form of an upright flat iron piece 25, 26 is provided at the rear and in front so as to prevent the carriages from rolling off the pair of rails. At the front end two such flat iron pieces 25 are mounted in such manner that the high and the low carriages may come to a stop against the same although they do not impede the loading of the carriages. Furthermore, upwardly inclined flat iron pieces 27 are mounted at the front end at both sides of the guide rails 6 to provide a ramp and thus act as a sloping brake for the flanged wheels of both carriages.

To explain the loading of the shelving, it is assumed that there are no pallets in the shelving compartment. Thus both carriages 11 and 12 of each compartment are located at the front edge of the shelving, each higher carriage 11 being on top of the lower carriage 12 at the place destined for the pallet 33. The first pallet to be set down thus is set down on the higher pallet carriage 11. As the fork-lift truck approaches with the second pallet 32, it uses this pallet to push the pallet on the higher carriage 11 together with the carriage toward the rear and then places the second pallet 32 on the lower carriage 12 which is now free and no longer has anything obstructing its top surface. As the fork-lift truck approaches with a third pallet 33, it uses the same to push the pallets 32 and 31 set down on the carriages 12 and 11, respectively, toward the rear. Now the shelving compartment is completely filled in this area.

When unloading with the fork-lift truck at first the front pallet 33 put down on the guide rails 6 is removed. This means that the two occupied carriages 11 and 12 roll forwardly on the slightly inclined rails until they reach the ramp. In similar manner the second pallet 32 can now be taken from the lower carriage 12 so that the high carriage 11 can roll forwardly and over the lower carriage 12 up to the front edge of the shelving. Then also pallet 31 can be removed by means of the fork-lift truck. Now the two empty carriages 11 and 12 are again disposed on top of each other at the front end of the pair of guide rails.

Figure 3:
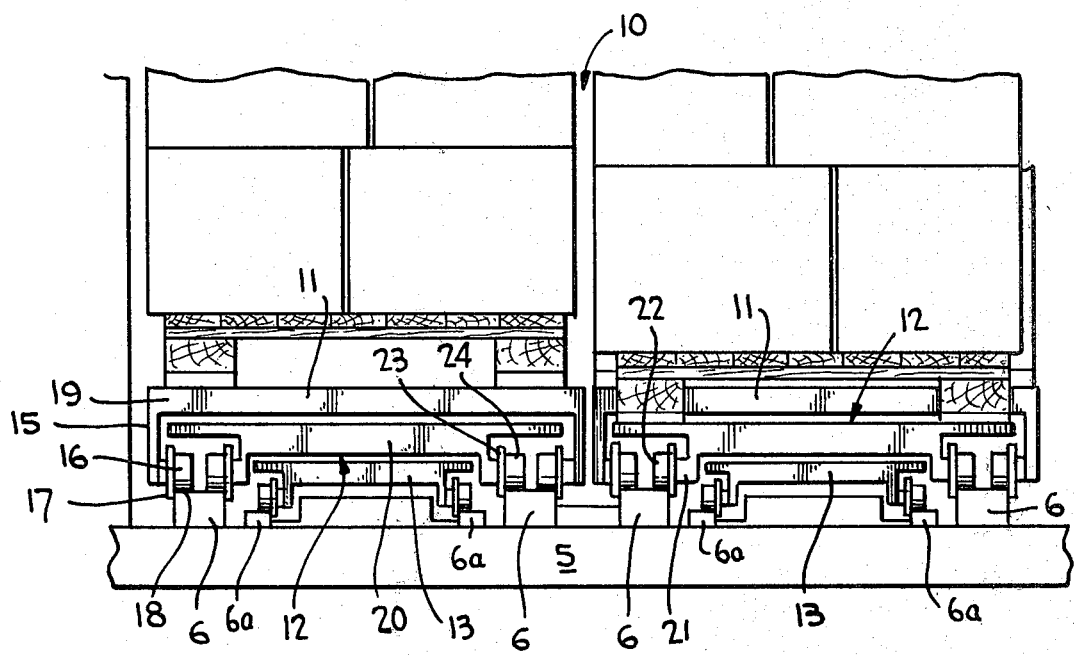
FIG. 3 is a front elevational view of another embodiment showing a third pallet carriage.

A further embodiment comprehends the provision of a third very flat pallet carriage and, as shown in FIG. 3, the third very flat pallet carriage 13 can be supported for rolling movement on another pair of rails 6a disposed between the first pair of rails 6. This third carriage 13 fits completely under the lower pallet carriage 12 which is designed with a corresponding free ground clearance. In this embodiment, the depth of the shelf can correspond to the depth of four pallets because a total of three pallets can be placed on their respective carriages behind the front pallet which is set down on the pair of guide rails or a pair of support rails.

What we claim is:

1. Shelving for pallets in which compartments defined by a frame are continuous in side by side relation and on top of one another and adapted to receive at least three pallets positioned on a plane which is inclined towards a common loading and unloading side of said frame, comprising:

at least one pair of rails, in each compartment, which extend at an inclination toward the common loading and unloading side; and at least two flat pallet carriages of different heights positioned in rolling engagement on said pair of rails, said at least two flat pallet carriages including a lower carriage being adapted to roll completely under a higher carriage wherein a first pallet may be positioned on said higher carriage, a second pallet may urge said first pallet and said higher carriage away from said common loading and unloading side and be positioned on said lower carriage and a third pallet may urge said first pallet and said higher carriage and said second pallet and said lower carriage away from said common loading and unloading side and be positioned on said pair of rails.

2. The shelving as claimed in claim 1, wherein each pallet carriage is supported by flanged wheels for rolling motion on a pair of rails.

3. The shelving as claimed in claim 2, wherein the higher carriage rolls on the rails by means of narrow flanged wheels having their flanges at the outside of the rails and having their roller extending at most to the middle of the rail head, while the lower carriage rolls on said rails by means of narrow flanged wheels having their flanges engage the inside of the rails and the roller of which likewise extending at most to the middle of the rail head.

4. The shelving as claimed in claim 2 or 3, comprising a third very flat pallet carriage which is supported for rolling movement on another pair of rails disposed between the first pair of rails and which fits completely under the lower pallet carriage designed with free ground clearance.

5. The shelving as claimed in one of claims 1 to 3, comprising at least one upwardly inclined ramp for the rollers acting as a sloping brake at or beside the front end of the rails.

6. Shelving for pallets according to claim 1, wherein each compartment includes a first abutment positioned at said common loading and unloading area and a second abutment spaced from said common loading and unloading area to prevent accidental removal of said pallets and said pallet carriages from said pair of rails.

* * * * *